Dec. 23, 1969    R. C. GRIFFITH ET AL    3,486,067
ILLUMINATION INTENSITY CONTROL CIRCUIT FOR OPTICAL DISPLAYS
Filed Sept. 28, 1966
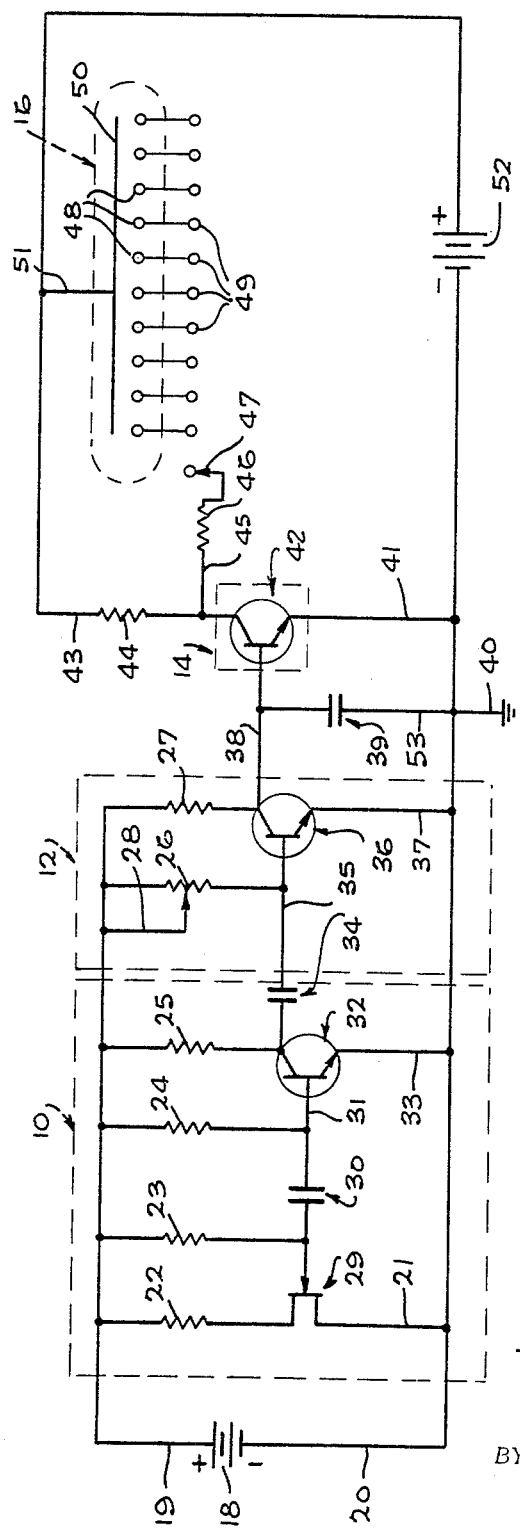
ROBERT C. GRIFFITH
DAVID A. GOODALL
  INVENTORS
BY
Ernest L. Brown
  ATTORNEY 3,486,067
ILLUMINATION INTENSITY CONTROL CIRCUIT
FOR OPTICAL DISPLAYS
Robert C. Griffith and David A. Goodall, Los Angeles,
Calif., assignors to Litton Systems, Inc., Beverly Hills,
Calif., a corporation of Maryland
Filed Sept. 28, 1966, Ser. No. 582,735
Int. Cl. H03k 23/18, 23/28
U.S. Cl. 315—84.6
8 Claims

ABSTRACT OF THE DISCLOSURE

An illumination intensity control circuit for optical displays comprising a reference oscillator for timing a pulse-width modulator which controls the flow of current to the electrodes of a nixie tube. The pulse-width modulator includes a reactance-variable resistance control circuit for extended control of the duty cycle of the current supplied to the tube; and the modulator is coupled to the oscillator in such a manner that the frequency of the oscillator is substantially independent of operation of the intensity control circuit.

---

This invention pertains to the electrical control of an optical display, and more particularly to the control of the intensity of a nixie tube display.

A nixie tube is a hermetically sealed enclosure having a gas, such as neon, inside, and in which the electrodes are arranged to ionize the gas in a configuration representing a numeral, letter, or other display configuration.

One of the difficulties with a nixie tube display is that the intensity ordinarily is not sufficient to be observed—for example—in the cockpit of an aircraft, particularly in the presence of sunlight or other bright illumination.

Merely increasing the current flow in the nixie tube to increase the intensity of the illumination would require larger power supplies and would generate a substantial amount of heat. The life expectancy of the nixie tube would also be shortened.

The device contemplated by this invention is adapted to pulse-width modulate the voltage and current applied to the electrodes of a nixie tube.

In a particular embodiment of the device of this invention, a reference oscillator is adapted to drive a variable pulse-width generator, to valve the flow of current to the electrodes of a nixie tube.

It is therefore an object of this invention to pulse-width modulate the flow of current to a nixie tube.

It is a more particular object of the invention to vary the width of the pulse of current applied to a nixie tube.

It is a more specific object of the invention to control the duty cycle of the current flow through the electrodes of a gas tube display device.

Other objects will become apparent from the following description, taken in connection with the only figure which shows a gas tube display device, together with an oscillator and variable pulse-width modulator connected to control the flow of current to the gas tube display device.

In the figure, a unijunction reference oscillator 10 is connected to trigger a variable pulse-width generator 12 to control a valving member 14, such as the power transistor 42. The valving member 14 is connected through a switch 47 and one of the terminals 49 to control the flow of current through a gas tube display device, or nixie tube, 16.

The voltage source 18 is connected to supply operating voltages to the reference oscillator 10 and the pulse-width modulator 12. The positive terminal of voltage source 18 is connected through conductor 19 to one terminal of resistors 22, 23, 24, 25, 26 and 27, and to the movable terminal 28 of resistor 26. Unijunction device 29 is connected by its extreme terminals to resistor 22 and to the negative terminal of voltage source 18. The middle terminal of unijunction device 29 is connected to one terminal of resistor 23 and is connected to one terminal of coupling capacitor 30. The other terminal of coupling capacitor 30 is connected to the base of transistor 32 and to a terminal of resistor 24. The collector of transistor 32 is connected to resistor 25 and to one terminal of coupling capacitor 34. The emitter of transistor 32 is connected to the negative terminal of voltage source 18. The other terminal of coupling capacitor 34 is connected to the base of transistor 36 and to a fixed terminal of resistor 26. The collector of transistor 36 is connected to resistor 27, to one terminal of bypass condenser 39, and to the base of power transistor 42. The emitter of transistor 36 is connected to the negative terminal of power source 18.

The ground connection 40 is merely a "zero" signal reference point. The second terminal of bypass condenser 39 is connected to ground connection 40 and to the negative terminals of power sources 18 and 52.

The negative terminal of power source 52 is connected to the emitter of power transistor 42. The positive terminal of the power source 52 is connected to the anode 50 of gas tube display device 16, and, through resistor 44, to the collector of power transistor 42.

The collector of the power transistor 42 is also connected through resistor 46 to the movable electrode 47 of a switch which is adapted to contact only one of the terminals 49. The switch 47, and the terminals 49, may be replaced by an electronic switch.

The elements 48 of gas tube display device 16 each represent a different cathode which is configured to cause the ionization of the gas within the envelope of tube 16, adjacent that particular cathode, to be displayed in the form of a letter, symbol, or numeral. In the shown device, there are 10 cathodes each—for example—corresponding to a separate numeral 0 . . . 9.

The position of the movable contact 47, or the energizing and connecting through an electronic switch (not shown) corresponding to the movable contact 47, typically is controlled by a computer—or the like.

Although the particular generator 10 appears to be of the lightest weight and to use the least amount of power, it is apparent that other generators, particularly other multivibrators, may be used in its place within the spirit and scope of the invention.

Further, it is apparent that other valving devices such as vacuum tubes, and the like, could be used in place of the transistors.

In operation, the positive voltage applied by voltage source 18 through resistor 24 to the base of transistor 32 initially causes transistor 32 to conduct. Because capacitor 30 is not charged, current also flows through resistor 23 and capacitor 30. The flow of current through capacitor 30 charges capacitor 30 and increases the voltage at the middle terminal, or emitter, of unijunction device 29. When the voltage on the emitter of unijunction device 29 reaches a critical value, substantial current starts to flow from the emitter of unijunction device 29 into the negative terminal of voltage source 18. The flow of current, because of the negative resistance characteristic of the unijunction device 29, causes the voltage on the emitter of device 29 to drop. Because the voltage across capacitor 30 cannot change instantaneously, the voltage on the base of transistor 32 is also depressed, driving transistor 32 into a cutoff region which extinguishes the flow of its collector-emitter current. When the current is extinguished in transistor 32, there is a tendency for the voltage on the base of transistor 32 to increase, but that tendency is resisted by the fact that the voltage across capacitor 30 cannot change instantaneously. Consequently, there is a flow of current through resistor 24 and capacitor 30 tending to charge capacitor 30 in a direction to increase the voltage on the base of transistor 32 until transistor 32 starts to conduct. When transistor 32 starts to conduct, the current through resistor 23 divides, reducing the current through unijunction 29 and increasing the flow of current through capacitor 30. As the current through unijunction device 29 decreases, the voltage on its emitter increases until the flow of current through unijunction device 29 is completely extinguished. Thus, the device 10 is a free running multivibrator in which the output signal, appearing at the collector of transistor 32, is cycled from one polarity to the other at a substantially constant frequency which depends upon the time constant of the circuit, and more specifically the resistances of resistors 23 and 24 and the capacitance of capacitor 30.

The output signal of the oscillator 10, appearing at the collector of transistor 32, is coupled through condenser 34 into the base of transistor 36. When the collector-emitter path of transistor 32 first starts to conduct, the collector potential drops from the voltage at the terminal of source 18 to some low positive value with respect to the negative terminal of source 18. Prior to the conduction of the collector-emitter path of transistor 32, transistor 36 is conducting through its collector-emitter path and the potential at the base of transistor 36 is slightly above the ground potential. There is, therefore, a substantial voltage across capacitor 34. When the collector voltage of transistor 32 drops, because the voltage across capacitor 34 cannot change instantaneously, the voltage at the base of transistor 36 is driven negatively into a cut-off region. The capacitor 34 then recharges in a direction to allow the base of transistor 36 to become positive, at a rate or a time constant depending upon the resistance of variable resistor 26 and the capacitance of capacitor 34. Thus, the period of conduction during each cycle of the multivibrator 10 is governed by the setting of variable resistor 26.

Power transistor 42 follows the voltage on the collector of transistor 36 to control the period of conduction of current flow from power source 52 through the anode 50 and a selected one of the cathodes 48 of the gas tube indicator or nixie tube 16. A bias voltage is applied to the collector of power transistor 42 through resistor 44.

Thus, a particular symbol, such as a numeral, e.g., "7" may be selected by the switch 47, or equivalent electronic switches (not shown) to cause the numeral, e.g., "7" to be displayed. The intensity of the display is determined by the setting of resistor 26.

Typical values of the parameters of the system are:

| Element No. | Parameter value or designation |
|---|---|
| 18 | 6 volts. |
| 22 | 1000 ohms. |
| 29 | Type 2N2420. |
| 23 | 24,000 ohms. |
| 30 | 0.15 micro-farad. |
| 24 | 6,200 ohms. |
| 25 | 1000 ohms. |
| 32 | Type 2N2369. |
| 34 | 0.039 micro-farad. |
| 26 | 50,000 ohm variable resistor. |
| 27 | 2,400 ohms. |
| 36 | Type 2N2369. |
| 39 | 0.01 micro-farad. |
| 42 | Type 2N2405. |
| 44 | 1 megohm. |
| 46 | 56,000 ohms. |
| 52 | 200 volts. |

Although the device has been described in detail above, it is not intended that the invention should be limited by that description but only in accordance with the spirit and scope of the appended claims.

What is claimed is:
1. In combination:
   a gas indicator tube having at least an anode and a cathode in which the region of ionization of the gas in said tube forms at least one predetermined symbol; and
   means for pulse-width modulating at a substantially constant repetition frequency the current applied between two predetermined ones of said anodes and cathodes to vary the intensity of illumination of a predetermined one of said symbols;
   wherein said means for pulse-width modulating comprises electrical valving means, connected into the anode-cathode current paths of said indicator tube; a pulse-width modulator, connected to control said valving means, said pulse-width modulator including a reactance-variable resistance circuit for adjusting the duty cycle of said pulse-width modulator over an extended control range; an oscillator for timing said pulse-width modulator; and means for coupling said oscillator to said pulse-width modulator so that the frequency of said oscillator is substantially independent of the adjustment of said reactance-variable resistance circuit.

2. A device as recited in claim 1 in which said valving means comprises a power transistor, said pulse-width modulator is a transistorized pulse-width modulator having a capacitor-variable resistor control circuit for varying the duty cycle of said pulse-width modulator over an extended control range, and said oscillator is a free running multivibrator.

3. A device as recited in claim 2 in which said free running multivibrator is a semiconductor circuit having two bi-stable elements, one of which is a transistor and the other of which is a unijunction device.

4. A device as recited in claim 1 in which said gas tube display device is a nixie tube.

5. A device as recited in claim 2 in which said gas tube display device is a nixie tube.

6. A device as recited in claim 3 in which said gas tube display device is a nixie tube.

7. A device as recited in claim 6 in which said nixie tube has a common anode and a plurality of cathodes, and further comprising means for selecting one of said cathodes to select said predetermined symbol.

8. A device as recited in claim 7 in which the configurations of cathodes of said nixie tubes are adapted to display the numerals 0, 1, 2, 3, 4, 5, 6, 7, 8, 9.

References Cited
UNITED STATES PATENTS

| 3,321,666 | 5/1967 | Garnett et al. | 315—209 |
| 3,225,215 | 12/1965 | Winter | 307—88.5 |
| 3,114,075 | 12/1963 | Apel | 315—84.6 |

JOHN W. HUCKERT, Primary Examiner

B. EPSTRIN, Assistant Examiner

U.S. Cl. X.R.

307—265, 301; 315—84.5